(12) United States Patent
Ishii

(10) Patent No.: US 8,411,796 B2
(45) Date of Patent: Apr. 2, 2013

(54) OFDM SIGNAL RECEIVER AND METHOD FOR RECEIVING OFDM SIGNAL

(75) Inventor: Tatsuji Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 1148 days.

(21) Appl. No.: 12/304,033

(22) PCT Filed: Feb. 22, 2008

(86) PCT No.: PCT/JP2008/000305
§ 371 (c)(1),
(2), (4) Date: Dec. 9, 2008

(87) PCT Pub. No.: WO2008/129754
PCT Pub. Date: Oct. 30, 2008

(65) Prior Publication Data
US 2010/0040173 A1 Feb. 18, 2010

(30) Foreign Application Priority Data
Apr. 13, 2007 (JP) .................. 2007-106089

(51) Int. Cl.
*H03K 9/00* (2006.01)
*H04L 27/06* (2006.01)
*H04J 11/00* (2006.01)
(52) U.S. Cl. .......................... 375/316; 375/341; 370/210
(58) Field of Classification Search .................. 375/316, 375/341; 370/210
See application file for complete search history.

(56) References Cited

U.S. PATENT DOCUMENTS

| | | | |
|---|---|---|---|
| 5,602,835 A * | 2/1997 | Seki et al. ..................... | 370/206 |
| 5,953,311 A * | 9/1999 | Davies et al. .................. | 370/210 |
| 6,359,938 B1 * | 3/2002 | Keevill et al. ................. | 375/316 |
| 6,754,292 B1 * | 6/2004 | Pulley et al. .................. | 375/343 |
| 6,999,406 B2 | 2/2006 | Takahashi et al. | |
| 7,139,338 B2 | 11/2006 | Wilson et al. | |
| 2002/0105903 A1 * | 8/2002 | Takahashi et al. ............ | 370/208 |
| 2002/0110202 A1 * | 8/2002 | Wilson et al. ................. | 375/340 |
| 2002/0159413 A1 * | 10/2002 | Tsubouchi et al. ........... | 370/335 |
| 2003/0142764 A1 * | 7/2003 | Keevill et al. ................. | 375/341 |

(Continued)

FOREIGN PATENT DOCUMENTS

| | | |
|---|---|---|
| JP | 2000-165338 | 6/2000 |
| JP | 2002-171238 | 6/2002 |
| JP | 2002-185423 | 6/2002 |
| JP | 2002-368717 | 12/2002 |
| WO | WO 2006/068186 A1 | 6/2006 |

*Primary Examiner* — David C. Payne
*Assistant Examiner* — Sarah Hassan
(74) *Attorney, Agent, or Firm* — McDermott Will & Emery LLP

(57) ABSTRACT

A Tu delay section (110) delays an analog-to-digital converted OFDM signal S01 by a time corresponding to an effective symbol period Tu. A correlation signal of an output of the Tu delay section (110) and OFDM signal S01 is obtained using a correlation calculating section (120). A delay section (130) outputs at least one delayed correlation signal obtained by delaying a correlation signal S02. Next, an adding section (140) performs addition of the correlation signal S02 and the delayed correlation signal, and then an interval integration section (150) performs transfer integration over a definite interval on a result of the addition. Then, a symbol period smoothing section (160) smoothes a result of the transfer integration for an interval of the effective symbol period of the OFDM signal S01, and then a window position detection section (170) calculates window position information from an output of the symbol period smoothing section (160).

5 Claims, 6 Drawing Sheets

U.S. PATENT DOCUMENTS

| | | | |
|---|---|---|---|
| 2004/0005022 A1* | 1/2004 | Zhu et al. | 375/365 |
| 2005/0100118 A1* | 5/2005 | Zhang | 375/343 |
| 2005/0123138 A1* | 6/2005 | Abe et al. | 380/255 |
| 2005/0147187 A1* | 7/2005 | Mori | 375/324 |

* cited by examiner

OFDM SIGNAL RECEIVER AND METHOD FOR RECEIVING OFDM SIGNAL

RELATED APPLICATIONS

This application is the U.S. National Phase under 35 U.S.C. § 371 of International Application No. PCT/JP2008/000305, filed on Feb. 22, 2008, which in turn claims the benefit of Japanese Application No. 2007-106089, filed on Apr. 13, 2007, the disclosures of which Applications are incorporated by reference herein.

TECHNICAL FIELD

The present invention relates to an OFDM signal receiver and a method for receiving an OFDM signal with which a signal modulated using an orthogonal frequency division multiplexing technique is received.

BACKGROUND ART

An orthogonal frequency division multiplexing technique (hereinafter referred to as OFDM technique) is a modulation technique used for digital terrestrial television broadcasting, wireless LAN, and the like.

In a signal (OFDM signal) used in the OFDM technique, an OFDM effective symbol period (hereinafter referred to as Tu) and a guard interval period (hereinafter referred to as Tg) form one OFDM symbol period. Therefore, an OFDM signal receiver for receiving the OFDM signal is required to detect a time window for cutting out a signal having an effective symbol period length.

As an example of such OFDM signal receiver, there is, for example, an OFDM signal receiver in which an amount of correlation between an OFDM signal and a signal resulted from delaying the OFDM signal by a time corresponding to an effective symbol period is obtained, transfer integration over an interval of Tg×2 is performed on the obtained amount of correlation, and in synchronization with a time when the integrated amount of correlation is maximum, a window signal is generated (see, for example, Patent Document 1).
[Patent Document 1] Japanese Unexamined Patent Publication No. 2002-171238

DISCLOSURE OF INVENTION

Problems To Be Solved By the Invention

However, the conventional OFDM signal receiver has a problem in that when signal power is small and there is a reflected wave delayed longer than the guard interval period Tg, the accuracy of window position detection deteriorates.

In the conventional OFDM signal receiver, in an amount of correlation between an input signal (a composite wave of a principal wave and a reflected wave of the OFDM signal) and a signal obtained by delaying the input signal of the OFDM signal receiver, the correlation of the principal wave whose power is great appears high and the correlation of the reflected wave appears low. That is, a difference is hardly made between a correlation integration value in an interval in which only the principal wave exists and the maximum value of correlation integration values of both the principal wave and the reflected wave. Therefore, it becomes difficult to detect the right end of a guard interval which is an optimal window position.

Moreover, since the area of interval integration is Tg×2, not whole amount of correlation of the reflected wave is reflected in the maximum value of a result of the integration, and thus the difference between the maximum value of the result of the integration and the correlation integration value of the principal wave hardly becomes notable. This deteriorates the accuracy of the window position which is to be detected on the basis of the maximum value of the result of the integration, and inter-symbol interference lowers reception capability.

The present invention was conceived in view of the problems mentioned above. An object of the present invention is to allow the window position detection to be performed with high accuracy even in a channel environment in which the signal power is small and a reflected wave delayed longer than the guard interval period exists.

Means For Solving the Problems

To achieve the object mentioned above, one embodiment of the present invention is an OFDM signal receiver including:
   a first delay section for receiving an analog-to-digital converted OFDM signal as an input and for delaying the OFDM signal by a time corresponding to an effective symbol period Tu of the OFDM signal and outputting the delayed signal;
   a correlation calculating section for outputting a correlation signal showing a correlation between the output of the first delay section and the OFDM signal;
   a second delay section for outputting at least one delayed correlation signal obtained by delaying the correlation signal;
   an adding section for performing addition of the correlation signal and the at least one delayed correlation signal;
   an interval integration section for outputting an integration signal showing a result of transfer integration over a definite interval performed on an output of the adding section;
   a symbol period smoothing section for smoothing the integration signal for an interval of the effective symbol period of the OFDM signal; and
   a window position detection section for calculating window position information from an output of the symbol period smoothing section.

One embodiment of the present invention is an OFDM signal receiver including:
   a first delay section for receiving an analog-to-digital converted OFDM signal as an input and for delaying the OFDM signal by a time corresponding to an effective symbol period Tu of the OFDM signal and outputting the delayed signal;
   a correlation calculating section for outputting a correlation signal showing a correlation between the output of the first delay section and the OFDM signal;
   an interval integration section for outputting an integration signal showing a result of transfer integration over a definite interval performed on the correlation signal;
   a second delay section for outputting a delay integration signal obtained by delaying the integration signal by a time corresponding to a guard interval period Tg of the OFDM signal;
   an adding section for performing addition of the integration signal and the delay integration signal;
   a symbol period smoothing section for smoothing an output of the adding section for an interval of the effective symbol period of the OFDM signal; and
   a window position detection section for calculating window position information from an output of the symbol period smoothing section.

Effects of the Invention

According to the present invention, it is possible to perform window position detection with high accuracy even in a channel environment in which signal power is small and a reflected wave delayed longer than a guard interval period exists.

DESCRIPTION OF REFERENCE NUMERALS

Figure 1:
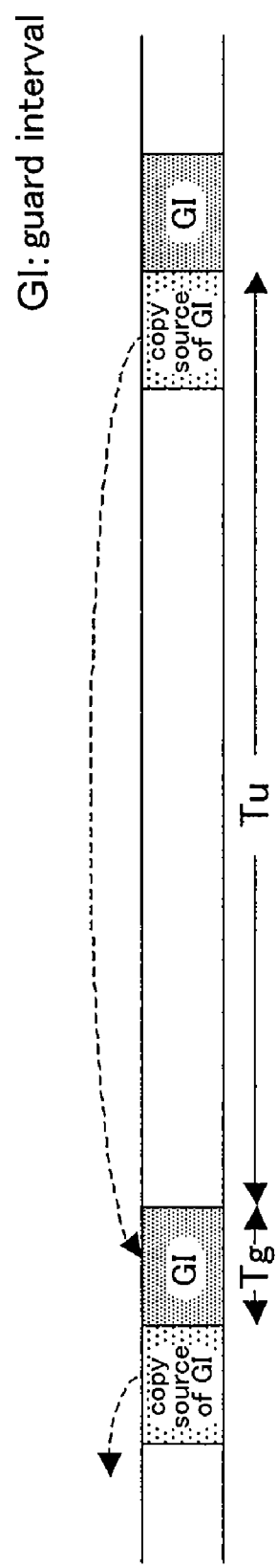
FIG. 1 is a view showing a symbol configuration of an OFDM signal.

100 OFDM Signal Receiver
110 Tu Delay Section
120 Correlation Calculating Section
130 Delay Section
140 Adding Section
150 Interval Integration Section
160 Symbol Period Smoothing Section
170 Window Position Detection Section
200 OFDM Signal Receiver
210 First Gain Adjustment Section
220 Second Gain Adjustment Section
S01 OFDM Signal
S02 Correlation Signal
S03 Delayed Correlation Signal
S04 Integration Signal
S05 Delay Integration Signal Best Mode For Carrying Out The Invention Embodiments of the present invention will be described below with reference to the drawings. It is to be noted that in the following descriptions of the embodiments and a variation thereof, components having the same functions as those of the components that have been described once are given the same reference numerals, and descriptions thereof are omitted.

(Embodiment 1 of the Invention)

An OFDM signal receiver receives an OFDM signal and detects a time window to cut out a signal having an effective symbol period length. FIG. 1 shows a symbol configuration of the OFDM signal. In the OFDM signal, an OFDM effective symbol period (hereinafter referred to as Tu) and a guard interval period (hereinafter referred to as Tg) form one OFDM symbol period. A signal used in Tg is a signal copied, at the time of transmission, from a signal in the same OFDM symbol.

(Configuration of OFDM Signal Receiver 100)

Figure 2:
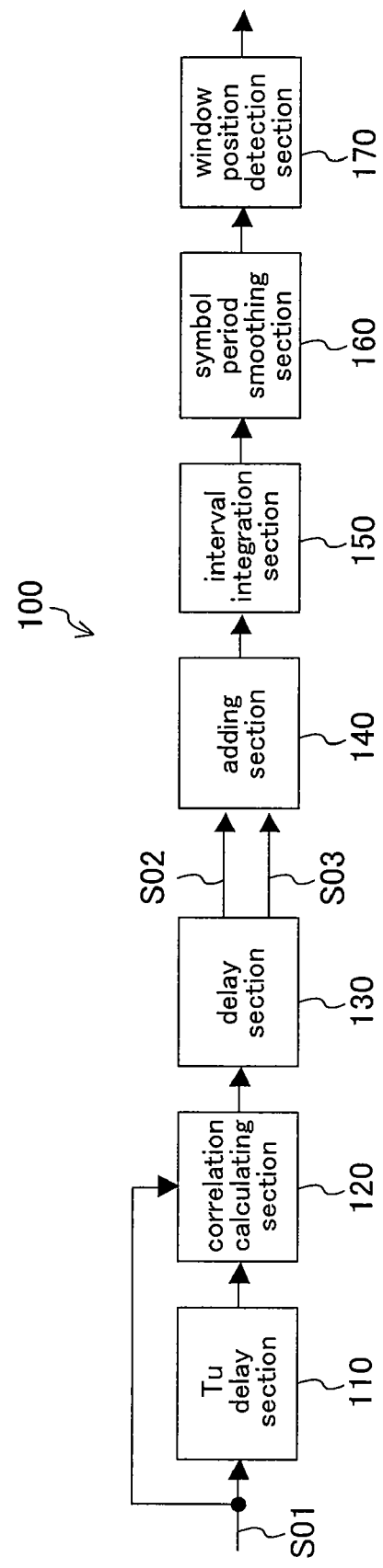
FIG. 2 is a block diagram showing a configuration of an OFDM signal receiver 100 according to Embodiment 1.

FIG. 2 is a block diagram showing a configuration of an OFDM signal receiver 100 according to Embodiment 1 of the present invention. As shown in FIG. 2, the OFDM signal receiver 100 includes a Tu delay section 110 (first delay section), a correlation calculating section 120, a delay section 130 (second delay section), an adding section 140, an interval integration section 150, a symbol period smoothing section 160, and a window position detection section 170.

The Tu delay section 110 receives an analog-to-digital converted OFDM signal S01 as an input, delays the OFDM signal S01 by a time corresponding to Tu, and outputs the delayed signal to the correlation calculating section 120.

The correlation calculating section 120 calculates the correlation between the OFDM signal S01 and the output of the Tu delay section 110 and outputs a signal (correlation signal S02) showing the correlation to the delay section 130.

The delay section 130 outputs the correlation signal S02 output from the correlation calculating section 120 and a signal (delayed correlation signal S03) obtained by delaying the correlation signal S02 by a time corresponding to Tg to the adding section 140.

The adding section 140 performs addition of signals input from the delay section 130 (the correlation signal S02 and the delayed correlation signal S03) and outputs the resultant signal.

The interval integration section 150 performs transfer integration over an interval of Tg×3 on the signal output from the adding section 140.

The symbol period smoothing section 160 smoothes an output of the interval integration section 150 by OFDM symbols.

The window position detection section 170 detects the maximum value of an output of the symbol period smoothing section 160, determines a range where a window is cut out (range where a signal is cut out) on the basis of the detected maximum value, and outputs a signal showing the determined window position.

(Operation of OFDM Signal Receiver 100)

First, descriptions are given of an operation of the OFDM signal receiver 100 in the case where signal power is sufficiently great and no reflected wave exists.

Figure 3:
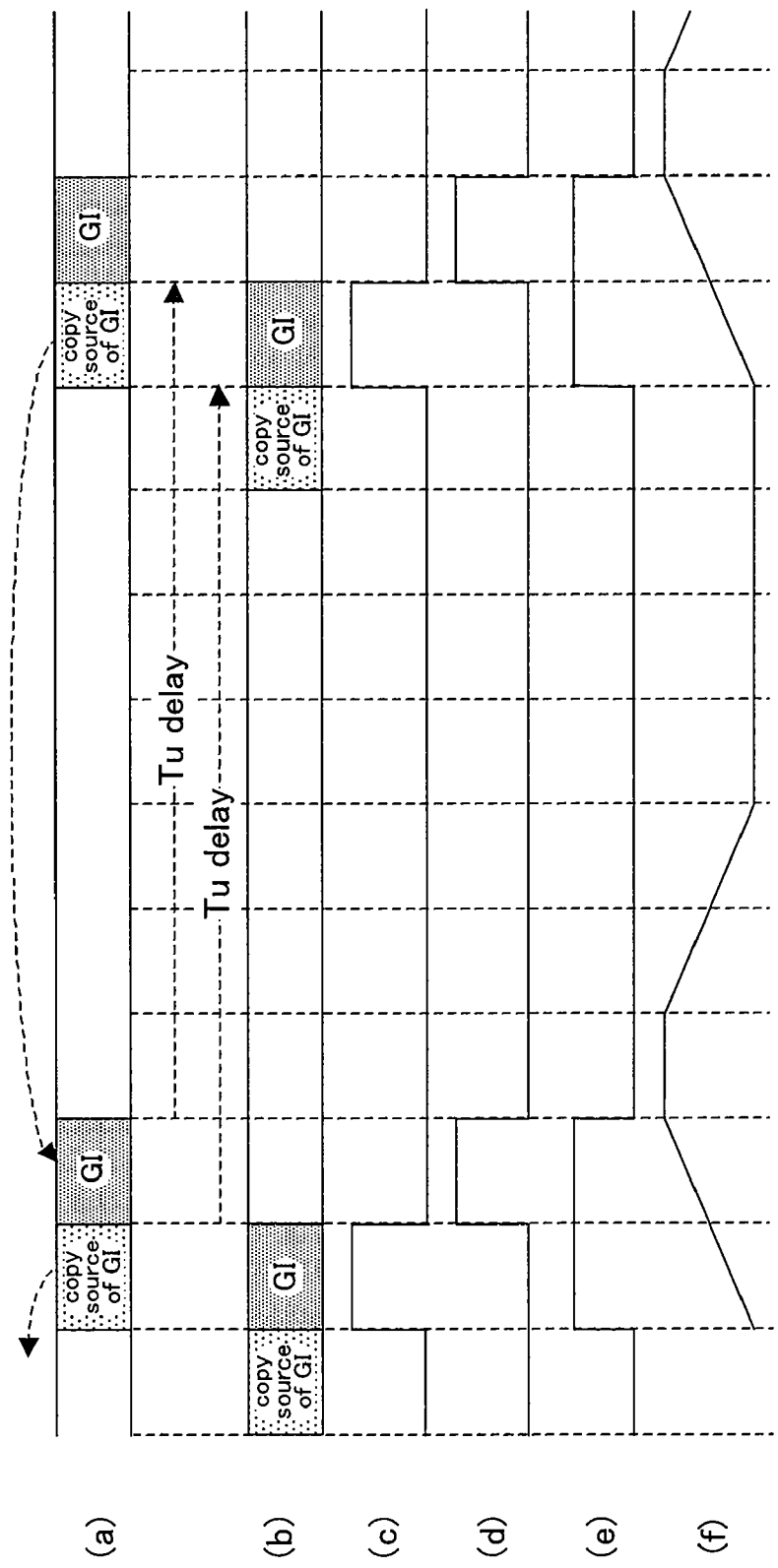
FIG. 3 is a time chart of an OFDM signal S01 and the other signals in the case where signal power is sufficiently great and no reflected wave exists.

FIG. 3 is a time chart of the OFDM signal S01 and the other signals in the case where the signal power is sufficiently great and no reflected wave exists. In the figure, a signal shown in a) is the OFDM signal S01 input to the Tu delay section 110. A signal shown in b) is an output of the Tu delay section 110. A signal shown in c) is an output of the correlation calculating section 120. A signal shown in d) is a delayed correlation signal S03 output from the delay section 130. A signal shown in e) is an output of the adding section 140. A signal shown in f) is an output of the interval integration section 150.

The Tu delay section 110 receives the OFDM signal S01, and then delays the OFDM signal S01 by a time corresponding to Tu and outputs the delayed signal to the correlation calculating section 120.

The correlation calculating section 120 performs a correlation operation on the OFDM signal S01 and the output of the Tu delay section 110. Since the output of the Tu delay section 110 is obtained by delaying the OFDM signal S01 by Tu, a GI in the output of the Tu delay section 110 is input to the correlation calculating section 120 at the same timing as that of a signal position of a GI which is a copy source at the time of transmission of the OFDM signal S01. Therefore, in the output of the correlation calculating section 120, the amount of correlation appears in a GI period of the output of the Tu delay section 110. In other periods, the output of the Tu delay section 110 and the OFDM signal S01 are uncorrelated, and thus the output of the correlation calculating section 120 approximates zero.

The output of the correlation calculating section 120 is input to the delay section 130. The delay section 130 outputs the output of the correlation calculating section 120 as a correlation signal S02, and further outputs a delayed correlation signal S03 obtained by delaying the output of the correlation calculating section 120.

The adding section 140 performs addition of the correlation signal S02 and the delayed correlation signal S03. Performing the addition of the correlation signal S02 and the delayed correlation signal S03 expands a period in which the correlation appears. In this example, as shown in e) of FIG. 3, the amount of correlation appears in a period of GI×2.

The output of the adding section 140 is input to the interval integration section 150. The interval integration section 150 performs interval integration over three times Tg. As shown in f) of FIG. 3, a period in which the output of the interval integration section 150 is maximum is as long as a period of a GI and is in a position shifted from a GI period of the OFDM signal S01 to the right by a period of 1×GI.

That is, within a range obtained by subtracting a period corresponding to the GI from the period in which the output of the interval integration section 150 is maximum, a signal corresponding to Tu is cut out from the OFDM signal S01, which makes it possible to perform a subsequent decoding process without inter-symbol interference.

For this purpose, the output of the interval integration section 150 is smoothed using the symbol period smoothing section 160. Then, the maximum value of the output of the symbol period smoothing section 160 is detected by the window position detection section 170 to determine a range where a window is cut out (range where a signal is cut out).

Next, descriptions are given of an operation of the OFDM signal receiver 100 in the case where the signal power is small and a reflected wave delayed longer than Tg exists.

Figure 4:
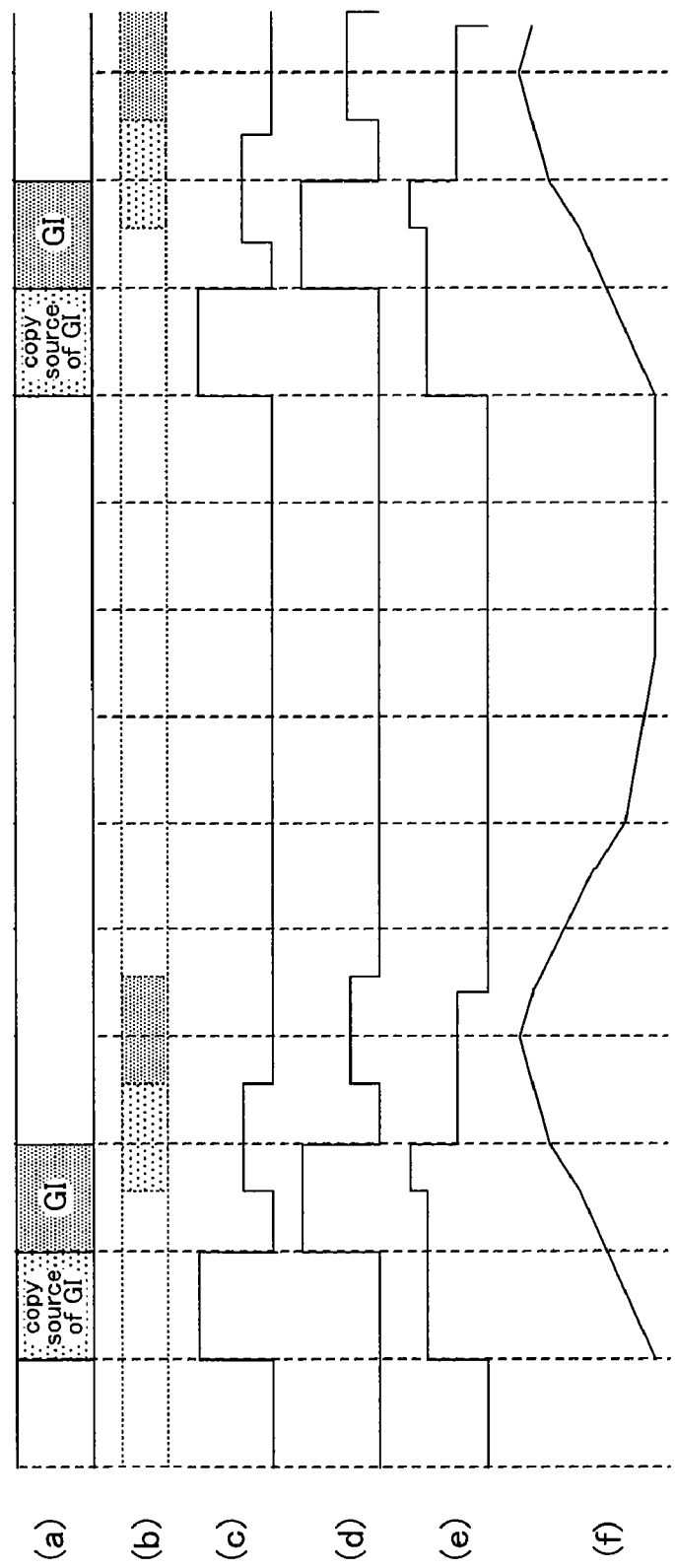
FIG. 4 is a time chart of the OFDM signal S01 and the other signals in the case where the signal power is small and a reflected wave delayed longer than Tg exists.

FIG. 4 is a time chart of the OFDM signal S01 and the other signals in the case where the signal power is small and the reflected wave delayed longer than Tg exists. In the figure, a signal shown in a) is a principal wave of an input signal to the OFDM signal receiver 100. A signal shown in b) is a reflected wave contained in the input signal. In this example, the reflected wave is smaller in power than the principal wave of the input signal and delayed by a period of Tg×1.5. The OFDM signal S01 input to the OFDM signal receiver 100 is a composite wave of the principal wave shown in a) and the reflected wave shown in b).

Moreover, a signal shown in c) is a correlation operation output of the correlation calculating section 120. A signal shown in d) is a delayed correlation signal S03 serving as an output of the correlation calculating section 120. A signal shown in e) is an addition output of the adding section 140. A signal f) is a Tg×3 interval integration output of the interval integration section 150.

The correlation calculating section 120 calculates the correlation of the composite wave. As a result, as shown in FIG. 4, in the output of the correlation calculating section 120 (that is, the correlation signal S02 serving as the output of the delay section 130), the correlation of the principal wave whose power is great appears high and the correlation of the reflected wave appears low. Then, addition of the correlation signal S02 and the delayed correlation signal S03 is performed, which increases amounts of correlation of the principal wave and the reflected wave which appear in the output of the adding section 140. Moreover, since an area of the interval integration in the interval integration section 150 is Tg×3, the amount of correlation of the reflected wave reflected in the maximum value of a result of the integration increases as compared to the conventional technique. Moreover, the expansion of the area of the interval integration increases the number of data accumulative additions, increasing a smoothing effect in a time direction. This further suppresses noise components other than the correlated signals. In the OFDM signal receiver 100, a period corresponding GI is subtracted from a maximum value point of the symbol period smoothing section 160 to obtain a window position.

As described above, according to the embodiment, since the area of the interval integration is expanded while a period in which the correlation appears is expanded, the window position detection can be performed with high accuracy even in the channel environment in which the signal power is small and the reflected wave delayed longer than Tg exists. That is, even in the channel environment in which the signal power is small and the reflected wave delayed longer than Tg exists, it is possible to prevent the inter-symbol interference.

(Embodiment 2 of the Invention)

Figure 5:
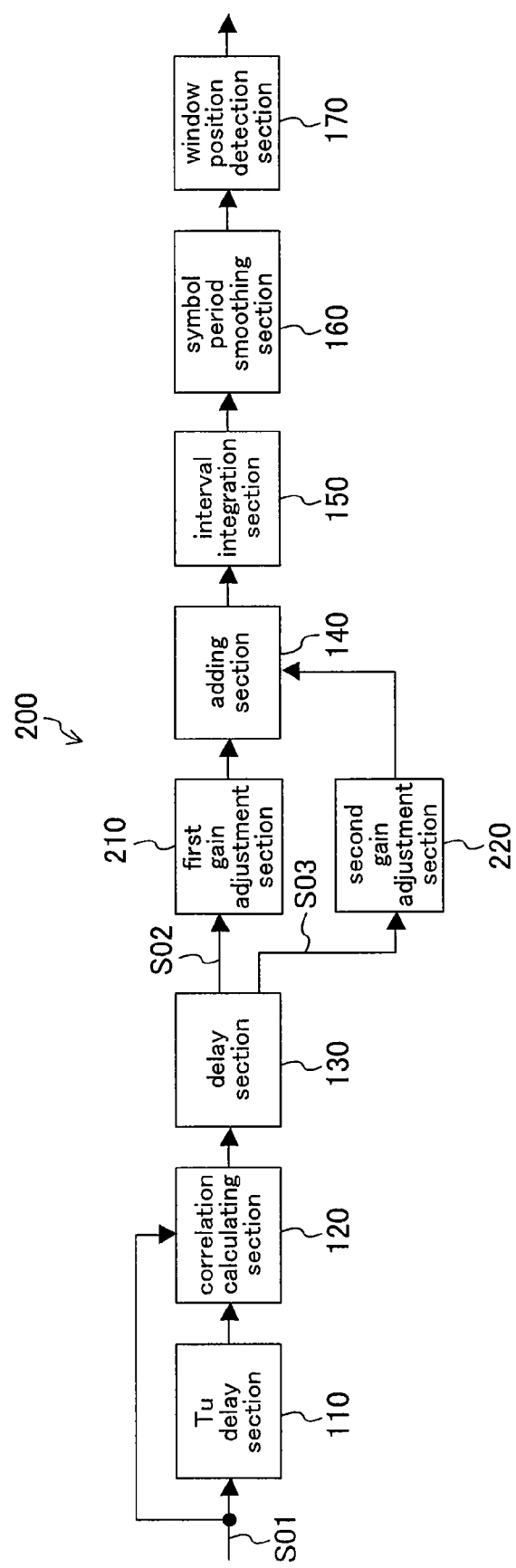
FIG. 5 is a block diagram showing a configuration of an OFDM signal receiver 200 according to Embodiment 2.

FIG. 5 is a block diagram showing a configuration of an OFDM signal receiver 200 according to Embodiment 2 of the present invention. As shown in FIG. 5, the OFDM signal receiver 200 has a configuration in which a first gain adjustment section 210 and a second gain adjustment section 220 are added to the OFDM signal receiver 100.

The first gain adjustment section 210 and the second gain adjustment section 220 are provided between the delay section 130 and the adding section 140.

The first gain adjustment section 210 adjusts a gain of the correlation signal S02 and outputs it to the adding section 140. Moreover, the second gain adjustment section 220 adjusts a gain of the delayed correlation signal S03 and outputs it to the adding section 140. That is, the adding section 140 of the present Embodiment performs addition of the correlation signal S02 whose gain is adjusted and the delayed correlation signal S03 whose gain is adjusted and outputs the resultant signal.

In the OFDM signal receiver 200, the gain adjustment makes it possible to adjust the amount of correlation of the reflected wave and the amount of correlation of the principal wave. Therefore, it is possible to realize the window position detection with higher accuracy.

(Variation of Embodiment 1 And Embodiment 2 of the Invention

Figure 6:
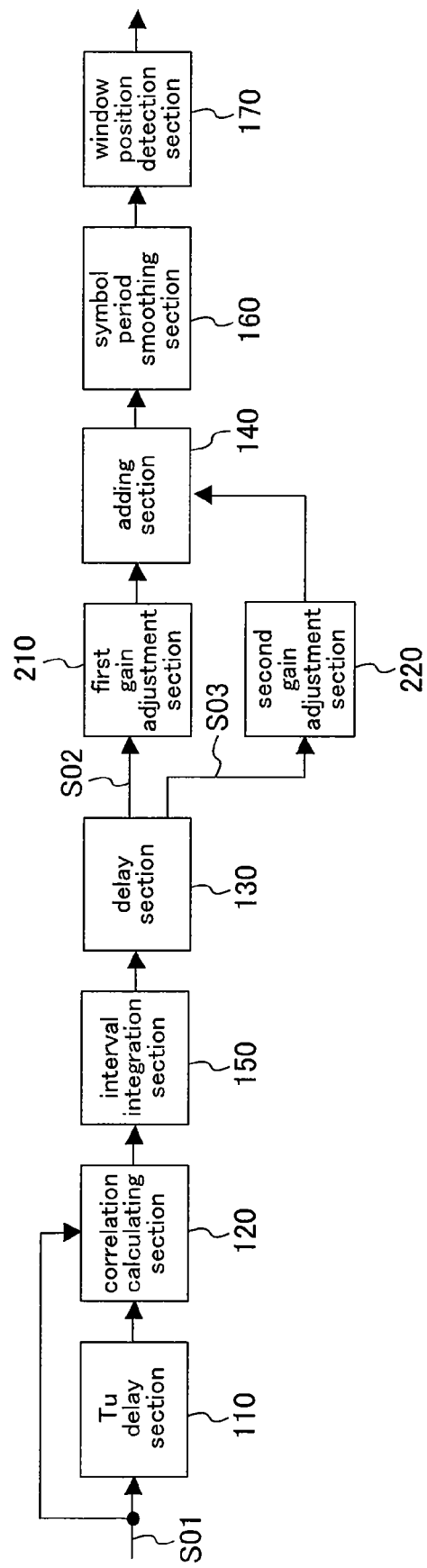
FIG. 6 is a block diagram showing a variation of Embodiment 2.

In Embodiment 1 and Embodiment 2, the interval integration section 150 may be provided directly downstream of the correlation calculating section 120, and the delay section 130 may delay a signal after the integration (integration signal S04). In this case, the correlation calculating section 120 is configured such that a delay integration signal S05 which is a signal obtained by delaying the integration signal S04 by a time corresponding to Tg is output to the second gain adjustment section 220 and the integration signal S04 is output to the first gain adjustment section 210. FIG. 6 is a variation of the OFDM signal receiver 200 in which the interval integration section 150 is provided directly downstream of the correlation calculating section 120. The OFDM signal receiver 100 may have a configuration similar to that as mentioned above.

It is to be noted that in the embodiments and the variation mentioned above, the delay section 130 may generate a plurality of kinds of delayed correlation signals (for example, a signal delayed by a time corresponding to 1×Tg and a signal delayed by a time corresponding to 2×Tg), and the adding section 140 may perform addition of the plurality of delayed signals and the correlation signal S02. Alternatively, the adding section 140 may perform addition of some delayed correlation signals selected from the plurality of delayed correlation signals and the correlation signal S02. In this case, a peak position of the interval integration output of the interval integration section 150 is different from those of the examples described in the above embodiments. Therefore, the range where a window is cut out (range where a signal is cut out) in the window position detection section 170 is required to be shifted.

Moreover, the delay amount of the delay section 130 in the embodiments described above and an integration interval of the interval integration section 150 are mere examples. The delay amount and the integration interval may be set such that the amount of correlation of the reflected wave is sufficiently reflected in the maximum value of a result of the integration.

Industrial Applicability

An OFDM signal receiver and a method for receiving an OFDM signal according to the present invention have the effect of allowing the window position detection with high accuracy even in a channel environment in which the signal power is small and a reflected wave delayed longer than the guard interval period exists and are useful as an OFDM signal receiver and the like for receiving a signal which is modulated using the orthogonal frequency division multiplexing technique.

The invention claimed is:

1. An OFDM signal receiver comprising:
a first delay section for receiving an analog-to-digital converted OFDM signal as an input and for delaying the OFDM signal by a time corresponding to an effective symbol period Tu of the OFDM signal and outputting the delayed signal;
a correlation calculating section for outputting a correlation signal showing a correlation between the output of the first delay section and the OFDM signal;
a second delay section for outputting at least one delayed correlation signal obtained by delaying the correlation signal;
an adding section for performing addition of the correlation signal and the at least one delayed correlation signal;
an interval integration section for outputting an integration signal showing a result of transfer integration over a definite interval performed on an output of the adding section;
a symbol period smoothing section for smoothing the integration signal for an interval of the effective symbol period of the OFDM signal; and
a window position detection section for calculating window position information from an output of the symbol period smoothing section.

2. The OFDM signal receiver of claim 1, further comprising:
a first gain adjustment section for adjusting a gain of the correlation signal; and
a second gain adjustment section for adjusting a gain of the at least one delayed correlation signal,
wherein the adding section performs addition of the correlation signal whose gain is adjusted and the at least one delayed correlation signal whose gain is adjusted.

3. The OFDM signal receiver of claim 1, wherein
the second delay section delays the output of the correlation calculating section by a time corresponding to a guard interval period Tg of the OFDM signal, and
the interval integration section performs transfer integration over a period of three times the guard interval period Tg of the OFDM signal on the output of the adding section.

4. The OFDM signal receiver of claim 1, wherein the window position detection section calculates the window position information on the basis of a point in which the output of the symbol period smoothing section is maximum.

5. A method for receiving an OFDM signal comprising:
a first delay step of receiving an analog-to-digital converted OFDM signal as an input and of delaying the OFDM signal by a time corresponding to an effective symbol period Tu of the OFDM signal and outputting the delayed signal;
a correlation calculating step of outputting a correlation signal showing a correlation between the output of the first delay step and the OFDM signal;
a second delay step of outputting at least one delayed correlation signal obtained by delaying the correlation signal;
an adding step of performing addition of the correlation signal and the at least one delayed correlation signal;
an interval integration step of outputting an integration signal showing a result of transfer integration over a definite interval performed on an output of the adding step;
a symbol period smoothing step of smoothing the integration signal for an interval of the effective symbol period of the OFDM signal; and
a window position detection step of calculating window position information from an output of the symbol period smoothing step.

* * * * *